US006706992B2

United States Patent
Hughes

(10) Patent No.: US 6,706,992 B2
(45) Date of Patent: Mar. 16, 2004

(54) WELDING APPARATUS AND METHOD FOR WELDING OVERLAPPING COATED SHEETS

(75) Inventor: Russell Vernon Hughes, Redford, MI (US)

(73) Assignee: International Aluminum Holdings Limited (GB)

( * ) Notice: Subject to any disclaimer, the term of this patent is extended or adjusted under 35 U.S.C. 154(b) by 0 days.

(21) Appl. No.: 10/194,743

(22) Filed: Jul. 12, 2002

(65) Prior Publication Data

US 2002/0175150 A1 Nov. 28, 2002

Related U.S. Application Data

(63) Continuation-in-part of application No. 10/048,206, filed as application No. PCT/GB00/02920 on Jul. 28, 2000.

(51) Int. Cl.$^7$ ................................................ B23K 10/00
(52) U.S. Cl. ........................... 219/121.45; 219/121.46; 219/121.64; 219/121.59; 219/137 WM; 219/137 R; 228/50; 228/262.4; 228/262.5
(58) Field of Search ....................... 219/121.64, 121.85, 219/121.45, 121.46, 121.59, 121.48, 137 R, 137 WM; 228/50, 262.5, 262.4

(56) References Cited

U.S. PATENT DOCUMENTS 4,159,410 A    6/1979  Cooper

| | | | |
|---|---|---|---|
| 4,386,728 A | * | 6/1983 | Torok et al. ................. 228/111 |
| 4,682,002 A | * | 7/1987 | Delle Piane et al. .... 219/121.64 |
| 4,684,779 A | * | 8/1987 | Berlinger et al. ...... 219/121.64 |
| 4,719,689 A | * | 1/1988 | Yamamoto et al. ........... 29/458 |
| 4,916,284 A | * | 4/1990 | Petrick ................... 219/121.64 |
| 5,449,107 A | | 9/1995 | Umeno et al. |
| 5,591,359 A | | 1/1997 | Saitou et al. |
| 5,938,948 A | | 8/1999 | Oros et al. |

FOREIGN PATENT DOCUMENTS

| | | |
|---|---|---|
| DE | 35 35 212 A1 | 4/1987 |
| EP | 0 509 778 A2 | 10/1992 |
| JP | 58087118 | 12/1984 |
| JP | 58123622 | 1/1985 |
| WO | WO 99 03634 | 1/1999 |

OTHER PUBLICATIONS

International Search Report dated Nov. 16, 2000.

* cited by examiner

*Primary Examiner*—Mark Paschall
(74) *Attorney, Agent, or Firm*—Carlson, Gaskey & Olds

(57) ABSTRACT

A welding apparatus spot welds two or more overlapping sheets having a coating, such as zinc coated steel or aluminum alloy with an oxide coating. A hole is formed in the upper sheet at the desired point of spot welding. A clamping cup of a plasma arc passes surrounds the hole and contacts the upper surface of the upper sheet. The torch heats the sheet, allowing entrapped vapors in the coating on the lower sheet to vent freely. Filler wire is added to fill the hole and to secure the overlapping sheets together. If the overlapping sheets are zinc coated steel, preferably the filler wire is copper based.

21 Claims, 3 Drawing Sheets

WELDING APPARATUS AND METHOD FOR WELDING OVERLAPPING COATED SHEETS

This application is a continuation in part of U.S. patent application Ser. No. 10/048,206 filed on Jan. 28, 2002 now pending, which is a 371 of claims priority to PCT application PCT/GB00/02920 filed on Jul. 28, 2000, which claims priority to Great Britain patent applications GB9918476.4 filed on Aug. 6, 1999 and GB9924304.0 filed on Oct. 15, 1999.

BACKGROUND OF THE INVENTION

The present invention relates generally to an apparatus and method for spot welding overlapping coated sheets together.

Zinc coated sheet steel is commonly used in the automobile industry. Spot welding is often employed to weld overlapping sheets of zinc coated steel together at a desired point. A problem with spot welding zinc coated steel is that the outgassing of zinc on the surface of the steel during welding can cause a violent explosion of material from the weldpool, causing damage to the welding apparatus.

Additionally, if the gap between the overlapping sheets is small, the gases cannot escape and can pressurize due to heating. The pressurized vapor can cause localized thinning of the top sheet around the periphery of the weld, decreasing the weld strength. This thinning problem greatly increases by the presence of oils or waxes on the surfaces of the sheets.

In a prior welding apparatus, oxygen has been employed to shield the zinc vapors released during welding. The oxygen increases the fluidity and wettability of the melted metal, allowing the zinc vapors to bubble out and escape through the molten metal without explosion.

Aluminum alloy has also been used in the automotive industry as a material for vehicle bodies due to its high strength and low weight. A surface film oxide forms rapidly on aluminum and its alloys when exposed to the atmosphere, preventing fusion between the sheets. Chemical cleaning process have been utilized to reduce the hydrated oxide film and to remove oils and lubricants. However, the oxide removal processes are time consuming, expensive and often employs chemicals which are toxic, hazardous, or environmentally unfriendly.

As the high thermal conductivity of aluminum alloy ranges from three to five times that of steel, significantly higher inputs of energy are also required for fusions, creating difficulties in the welding of aluminum alloy.

SUMMARY OF THE INVENTION

A welding apparatus spot welds two or more overlapping sheets having a coating. The overlapping sheets can be zinc coated steel, aluminum alloy with an oxide coating, or other coated materials.

A hole is formed in the upper sheet at the desired point of welding. The sheets are positioned such that the hole is aligned with the plasma arc torch of the welding apparatus.

The plasma arc passes through the hole and contacts the upper surface of the sheet below the upper sheet. The torch heats the upper surface of the sheet, allowing entrapped vapors and lubricants to vent freely. Filler wire melted by the torch is added to fill the hole and secure the overlapping sheets together. If the overlapping sheets are zinc coated steel, preferably the filler wire is copper based and includes alloys of silicon bronze, aluminum bronze, and cupro-nickel. If the overlapping sheets are aluminum alloys with an oxide coating, the filler wire is preferably aluminum.

BRIEF DESCRIPTION OF THE DRAWINGS

An embodiment of the present invention will now be described with reference to the accompanying drawings in which.

DETAILED DESCRIPTION OF THE PREFERRED EMBODIMENT

Figure 1:
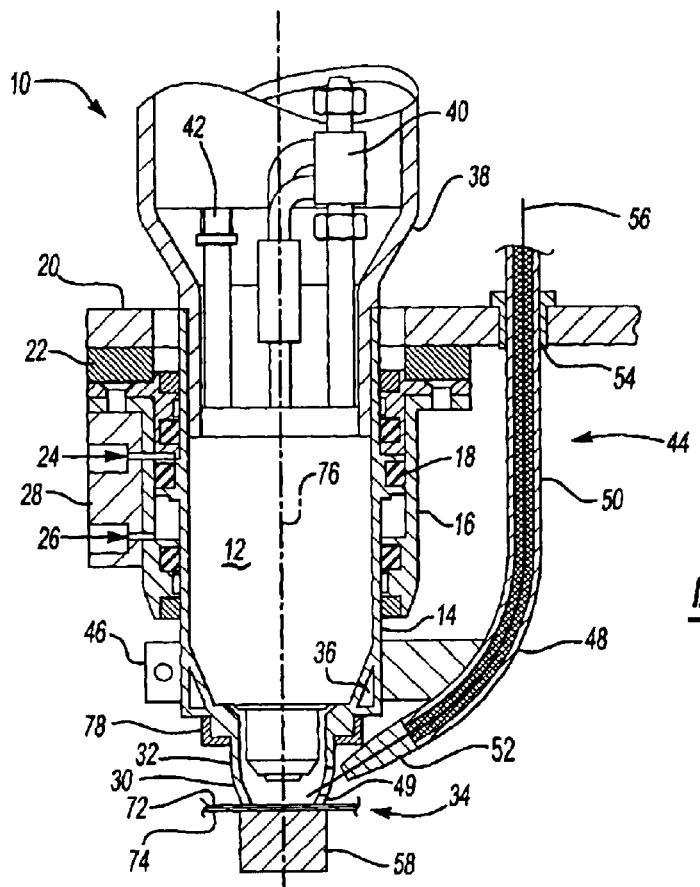
FIG. 1 shows cross-sectional side view of the welding apparatus.

FIG. 1 illustrates a welding apparatus 10 including a plasma arc welding torch 12 mounted on a movable carriage 14. The carriage 14 is movable within a cylinder 16, and an outer portion of the carriage 14 carries a peripheral seal 18 which enables the carriage 14 to act as a piston. The cylinder 16 is connected to a mounting bracket 20 via a vibration absorbent compliance ring 22. The carriage 14 is movable relative to the cylinder 16 by the selective application of fluidic pressure, such as pneumatic pressure, to the cylinder 16 via apertures 24, 26 provided in the wall. As can be readily seen, the apertures 24, 26 are provided above and below the peripheral seal 18. A porting block 28 is provided adjacent the apertures 24, 26 to enable connection of a suitable source of fluidic pressure.

The constricting orifice 30 of the welding torch 12 projects from the carriage 14 and is shrouded by a clamp cup 32 carried by the carriage 14. The clamp cup 32 is connected to the carriage 14 by a retaining ring 78. The clamp cup 30 serves both to clamp a workpiece 34 and to ensure adequate gas shielding of the weld site. The carriage 14 is provided with cooling channels 36 to allow the circulation of coolant to cool the welding torch 12 when it is in operation. The welding torch 12 is retained in the carriage 14 by a tubular retaining sheath 38. The sheath 38 also houses the gas and power connections 40, 42 of the welding torch 12.

A filler wire guide 44 is connected to the carriage 14 by a support clamp 46. The wire guide 44 includes a curved guide tube 48 passing through the mounting bracket 20 and containing a liner 50 and a tapered tip 52. As guide tube 48 is connected to the movable carriage 14 by the support clamp 46, an insulated guide bush 54 is provided in the mounting bracket 20 to allow relative movement of the guide tube 48. Filler wire 56 is movable through the wire guide 44 by an appropriate feed mechanism. Typically, the filler wire 56 is stored in the feed mechanism on a drum. The tip 52 of wire guide 44 is positioned so as to feed the filler wire 56 through an aperture 49 in the clamp cup 32.

Preferably, the movement of the filler wire 56 is at a relatively shallow angle to the plane of the weld, preferably above 30° and most preferably up to 45°. A thinner wire 44 would require a faster rate of feed and be more likely to buckle. A thicker wire 44 might be more difficult to feed to the weld pool because of curvature of the feed path.

The feed wire 56 may be movable by a feed mechanism operable to move the wire or filament at one or more predetermined feed rates relative to the weld pool. Typically, a feed speed of 4 meters per minute and a withdrawal speed of 5 meters per minute are suitable. These factors are variable by the skilled man in order to obtain an optimum weld. Preferably, the feed mechanism includes a guide mechanism to guide the wire to a predetermined location in the weld pool.

Figure 2:
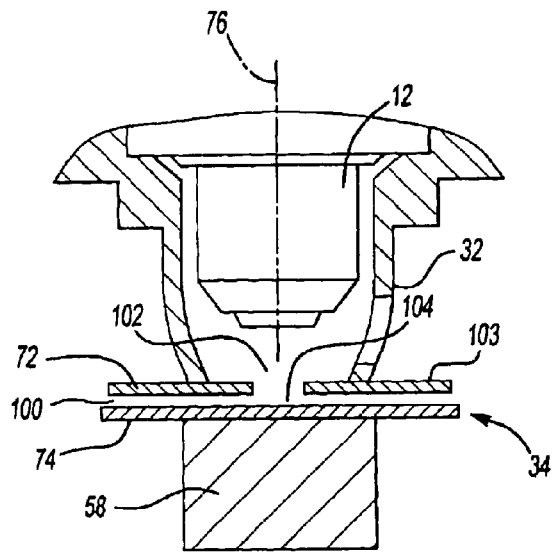
FIG. 2 shows a side view of the welding apparatus prior to welding.

As shown in FIG. 2, the workpiece 34 includes two overlapping sheets 72 and 74 positioned on a support surface 58. A small gap 100 existing between the overlapping sheets 72 and 74 is shown enlarged for illustrative purposes. Although only two overlapping sheets 72 and 74 are shown, it is to be understood that any numbers of overlapping sheets 72 and 74 can be employed. Preferably, the overlapping sheets 72 and 74 are zinc coated steel. However, other coated materials can be employed, such as aluminum alloy or magnesium alloy with an oxide coating.

A hole 102 is formed in the upper sheet 72 at the location of the spot weld, exposing part of the upper surface 104 of the sheet 74. The hole 102 is formed by drilling, punching, or by other suitable methods. The workpiece 34 is then positioned such that the hole 102 is aligned with a nominal axis 76 of the welding torch 12. The carriage 14 is lowered until the clamp cup 32 of the welding torch 12 surrounds the hole 102 and contacts the upper surface 103 of the upper sheet 72, clamping the workpiece 34 against the support member 58 and preventing the sheets 72 and 74 from moving relative to one another during welding.

Figure 3:
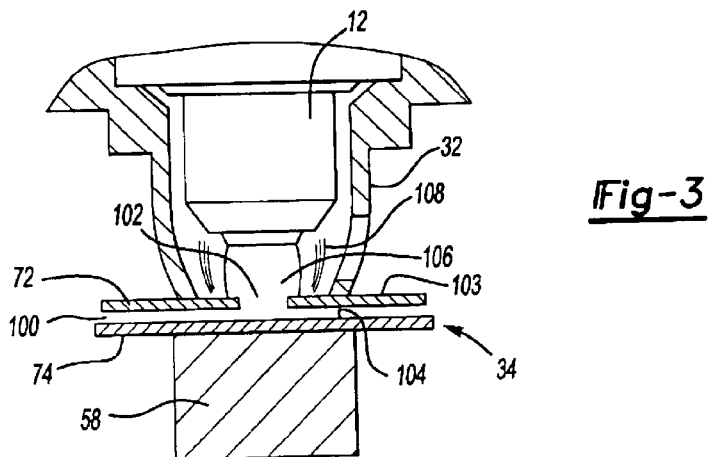
FIG. 3 illustrates a side view of the welding apparatus when the welding arc enters the hole and contacts the sheet below the upper sheet.

As shown in FIG. 3, once the high temperature welding arc 106 contacts the upper surface 103 of the upper sheet 72, entrapped gases or volatile lubricants 108 on the sheet 74 freely vent to the atmosphere around the zone of the welding arc 106. If the sheets 72 and 74 are zinc coated steel, the heat from the welding arc 106 release zinc vapor from the upper surface 104 of the sheet 74 in the location of the hole 102.

Figure 4:
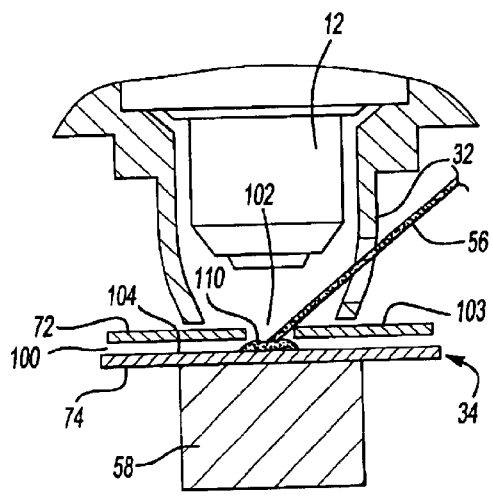
FIG. 4 illustrates a side view of the welding apparatus during the addition of filler wire.

As shown in FIG. 4, filler wire 56 is added to fill the hole 102 and secure the sheets 72 and 74 together. As the filler wire 56 is advanced, a weld pool 110 is created. Preferably, the filler wire 56 has a composition dissimilar to the composition of the sheets 72 and 74. If the sheets 72 and 74 are zinc coated steel, the filler wire 56 is preferably copper based and includes alloys silicon bronze, aluminum bronze, or cupro-nickel. In one example, the filler wire 56 is 96% copper, 3% silicon, and 1% manganese. A filler wire 56 having a composition similar to the zinc coated steel can be also be used.

As copper has a melting temperature of approximately 1000° C. and the steel melts at approximately 1500° C., the copper based filler wire 56 melts prior to the melting of the steel. Once the filler wire 56 has been advanced into the weld pool 110, the filler wire 56 is held there for a predetermined time to allow the filler wire 56 to melt and become incorporated in the hole 102. As the melting temperature of the steel sheets 72 and 74 is greater than the melting temperature of the copper based filler wire 56, the steel sheets 72 and 74 are undisturbed.

Figure 5:
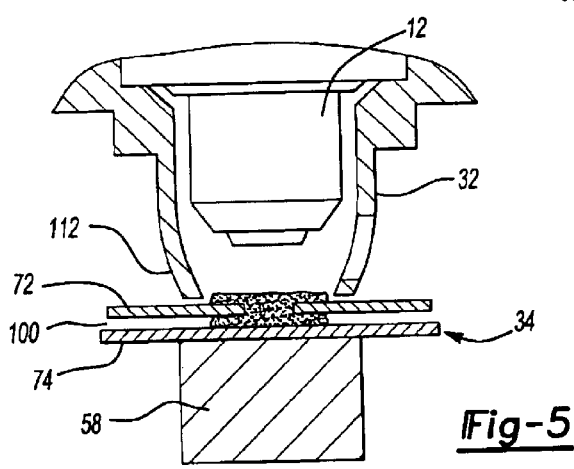
FIG. 5 illustrates a side view of the welding apparatus after the addition of the filler wire.

As shown in FIG. 5, after the filler wire 56 melts and fills the hole 102, a spot weld 112 is produced that slightly flows in the gap 100 between the sheets 72 and 74, further increasing the strength of the spot weld. The workpiece 34 can then be unclamped and removed from the apparatus 10.

Other coated materials can be employed, such as oxide coated aluminum alloy or oxide coated magnesium alloy. When the welding arc 106 contacts the upper surface 104 of the lower sheet 74, entrapped gases in the oxide film can freely vent. The filler wire 56 can be a mixture of aluminum and magnesium or silicon. As the sheets 72 and 74 of aluminum alloy are the same material as the filler wire 56 of aluminum, the sheets 72 and 74 and the filler wire 56 have a similar melting temperature.

In one example, sheets 74 and 76 are 5754 aluminum alloy which require a plasma gas (Argon) flow rate of 1.5 to 1.8 liters per minute, and the filler wire is 5554 aluminum alloy having a diameter of 1.6 mm. The weld has an overall diameter of 8 mm on the blind side and 10 mm on the front side.

Figure 6:
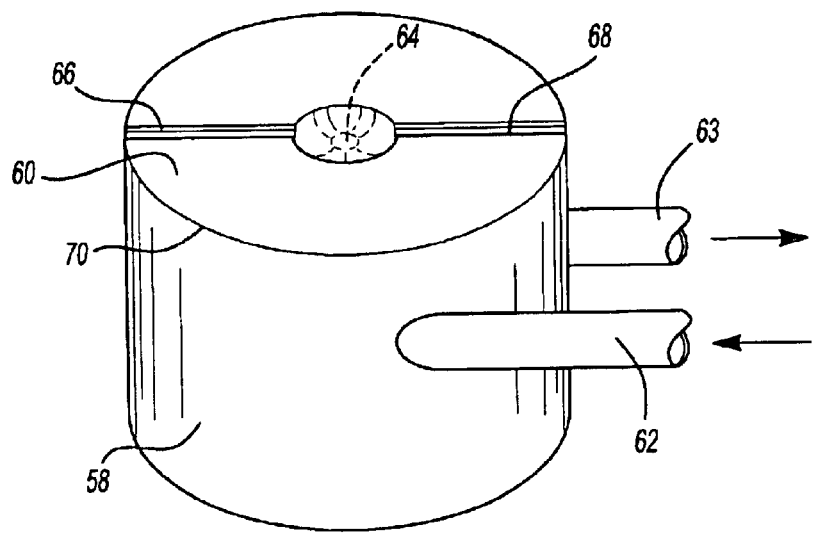
FIG. 6 illustrates a side view of the support member.

FIG. 6 illustrates one example of the support member 58 which includes a support surface 60 against which the workpiece 34 rests. The support member 58 has a hollow interior into which coolant is circulated via an inlet 62 and an outlet 63. A recess 64 is provided in the support surface 60 and two channels 66 and 68 extend in opposing directions from the recess 64 to the edge 70. The raising of the edge 70 is small, preferably about 0.05 mm.

If the sheets 72 and 74 are aluminum and the filler wire 56 is aluminum, the welding torch 12 melts the aluminum sheet 74 below the hole 100, producing a weld pool contained by the recess 64. Any air present in the weld pool that expands due to heating vents through channels 66 and 68, also providing an escape for surface coatings, such as wax, present on the sheet 74.

Figure 7:
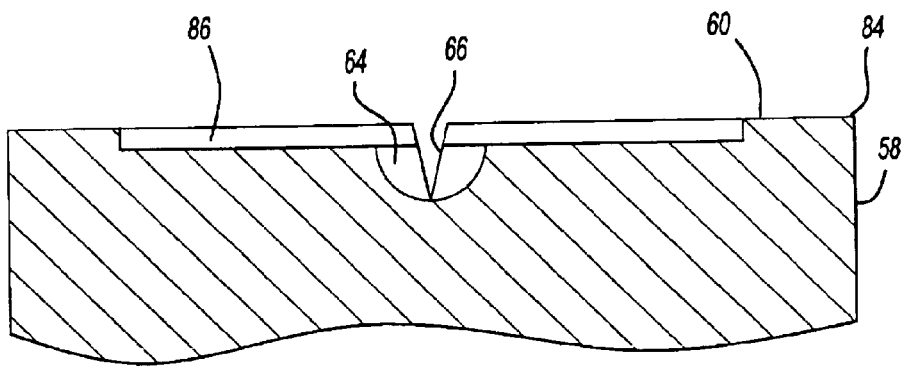
FIG. 7 illustrates a side view of an alternative support member.

FIG. 7 illustrates an alternative support member 58 having a peripheral raised edge 84 which defines a substantially annular support surface 60. The recess 64 is in the middle of the support surface 60. The raised edge 84 enables an air gap 86 to be provided between the support member 58 and the workpiece 34 around the weld site, reducing the transfer of heat from the workpiece 34 to the support member 58 during welding.

Figure 8:
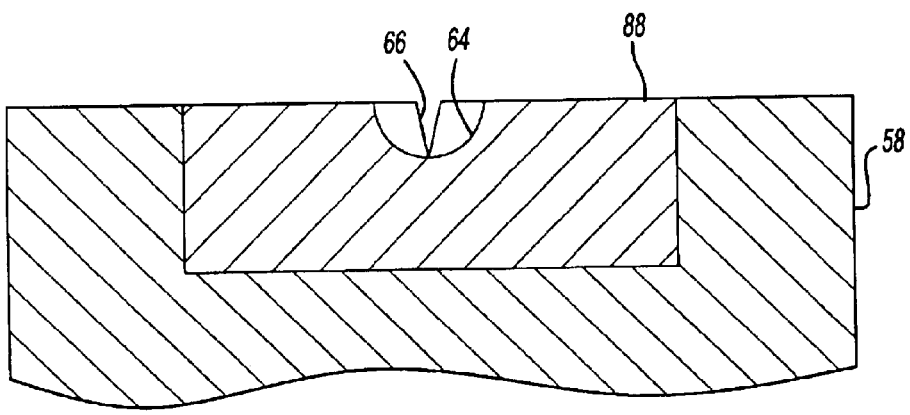
FIG. 8 illustrates a side view of an alternative support member.

FIG. 8 illustrates an alterative support member 58 having an insert 88 configured to define the recess 64 and vent channels 66 and 68. The insert 88 is manufactured from a material having a thermal conductivity lower than the support member 58. The insert 88 may be a high temperature non-metallic material which is not wetted by the molten metal of the weld pool or a ceramic material such as reaction bonded silicon nitride. As the insert 88 has a lower thermal conductivity than the support member 58, the support member 58 does not need to be cooled as less heat energy is transferred to the support member 58 during welding. If each aluminum sheet 72 and 74 has a thickness of 1 mm and a water cooled copper support 58 is used, a welding current of 150 amps for 3 seconds is required. By substituting an uncooled copper support 58 having a ceramic insert 88, a welding current of 105 amps for 2 seconds is required.

The insert 88 may also be manufactured from an electrically conductive material having a lower thermal conductivity than the main body of the support member 58. The insert 88 ensures that the support member 58 is electrically conductive and ensures that the electrical circuit formed between the workpiece 34 and the welding torch 12 is not broken during welding.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A method of welding a plurality of overlapping members having a coating comprising the steps of:

provide a hole in an upper member;

releasing said coating on a lower member located below said hole in a vapor hole; and introducing a filler into said hole to secure said upper member to said lower member.

2. The method as recited in claim 1 wherein the step of providing said hole includes drilling.

3. The method as recited in claim 1 wherein the step of providing said hole includes punching.

4. The method as recited in claim 1 wherein the step of releasing said coating is achieved by utilizing a welding torch.

5. The method as recited in claim 1 wherein the step of introducing said filler includes advancing said filler into said hole, holding said filler in said hole to form a weld pool, and withdrawing said filler.

6. The method as recited in claim 1 further including the step of clamping said overlapping members prior to the step of releasing said coating.

7. The method as recited in claim 1 wherein said overlapping members are steel and the coating is zinc.

8. The method as recited in claim 7 wherein said filler is copper based wire.

9. The method as recited in claim 1 wherein said overlapping members are aluminum alloy and the coating is oxide.

10. The method as recited in claim 9 wherein said filler is aluminum wire.

11. The method as recited in claim 1 wherein said overlapping members are supported from beneath by a support member.

12. The method as recited in claim 1 wherein a gap exists between said upper member and said lower member, and said filler flows in said gap.

13. The method as recited in claim 1 wherein said filler has a melting temperature lower than a melting temperature of said overlapping members.

14. A welding apparatus for welding a plurality of overlapping members having a coating comprising:

an upper member including a hole positioned over a lower member;

a plasma arc torch operable to release said coating from said lower member under said hole; and a filler to fill said hole and secure said lower member to said upper member.

15. The apparatus as recited in claim 14 further including a supporting member to support said overlapping members from beneath.

16. The apparatus as recited in claim 14 wherein said overlapping members are steel and the coating is zinc.

17. The apparatus as recited in claim 16 wherein said filler is copper based wire.

18. The apparatus as recited in claim 14 wherein said overlapping members are aluminum alloy and the coating is oxide.

19. The apparatus as recited in claim 18 wherein said filler is aluminum wire.

20. The apparatus as recited in claim 1 wherein a gap exists between said upper member and said lower member, and said filler flows in said gap.

21. The apparatus as recited in claim 1 wherein said filler has a melting temperature lower than a melting temperature of said overlapping members.

* * * * *